United States Patent [19]

Fuchs et al.

[11] Patent Number: 4,487,132
[45] Date of Patent: Dec. 11, 1984

[54] CONVEYING SYSTEM

[75] Inventors: Gilbert Fuchs; Norman Crowley; Randall Wink, all of Evansville, Ind.

[73] Assignee: Evana Tool and Engineering, Inc., Evansville, Ind.

[21] Appl. No.: 408,817

[22] Filed: Aug. 17, 1982

[51] Int. Cl.³ .............................................. B61B 13/12
[52] U.S. Cl. ...................................... 104/166; 74/89
[58] Field of Search ................... 104/166; 198/861; 74/89

[56] References Cited

U.S. PATENT DOCUMENTS

| | | | |
|---|---|---|---|
| 3,818,837 | 6/1974 | Jacoby et al. | 104/166 |
| 3,897,735 | 8/1975 | Watts | 104/166 |
| 4,074,632 | 2/1978 | Kurahasi et al. | 104/166 X |
| 4,355,581 | 10/1982 | Mitani | 104/166 |

Primary Examiner—Randolph Reese
Attorney, Agent, or Firm—Larson and Taylor

[57] ABSTRACT

A conveying system for moving an object along a straight path on a pallet is disclosed. The conveying system includes a track on which the pallet is mounted for movement and a cylindrical drive shaft having a longitudinal axis parallel to the line of movement of the pallet disposed below the track. A drive roller support base is pivotally mounted on the pallet. The drive roller is rotatably mounted on a shaft extending from the support base at an acute angle with respect to the axis of the drive shaft. The drive roller tangentially contacts the drive shaft. Rotation of the drive shaft causes rotation of the drive roller and, depending upon the position of the drive roller in relation to the surface of the driveshaft, the pallet is driven forward, rearward, or remains stationary. The drive roller is resiliently urged into contact with the drive shaft and is pivotally mounted on the pallet so as to be easily movable between a forward drive position, a rearward drive position, and a stationary position. A resilient bias to urge the drive roller to the forward position is also provided together with a cam mechanism which moves the drive roller to the stationary position where desired.

18 Claims, 4 Drawing Figures

CONVEYING SYSTEM

FIELD OF THE INVENTION

The present invention relates generally to a conveying system which moves a pallet along a straight path, and more particularly to a conveyor system in which propulsion for the pallet is provided by a drive roller in contact with a rotating drive shaft.

BACKGROUND OF THE INVENTION

Conveying systems utilizing a rotating drive shaft and a contacting drive wheel have been disclosed in the prior art. Typical of such devices are those disclosed in the following U.S. Pat. Nos.: 3,356,040 (Fonden); 3,118,393 (Ohlin); 3,858,626 (Ribordy); and 3,858,707 (Block et al). In all of these patents, the drive wheel is mounted for rotation so that a radial surface of the drive wheel contacts the drive shaft.

While this type of conveying system is workable, a number of disadvantages exist. For example, the longitudinal drive shaft must be rotated at a high speed, such as 320 RPM. In addition, a significant bearing force must be exerted between the radial surface of the drive wheel and the drive shaft in order to cause relative movement. For example, a force of 225 pounds may be necessary. The result of the high speed of rotation and large bearing force is a rapid wearing of the drive wheel.

SUMMARY OF THE INVENTION

In accordance with the present invention, a conveying system having a cylindrical drive shaft rotating about a longitudinal axis thereof and a drive roller contacting the drive shaft is provided. The drive roller is rotatable about an axis and has an axial face which engages the drive shaft. The conveying system also includes a pallet and a track means for mounting the pallet for movement parallel to the drive shaft. A mounting means is also provided for mounting the drive roller on the pallet so that the axis of rotation of the drive roller is disposed at an acute angle with respect to the longitudinal axis of the drive shaft. In this manner, the axial face of the drive roller tangentially contacts the rotating drive shaft so that the pallet is driven along the track means.

In the preferred embodiment of the present invention, the drive roller is resiliently urged in contact with the drive shaft, for example with less than 50 pounds of force. The drive roller is mounted in a base which is pivotally attached to the pallet such that the drive roller is movable between a forward drive position and a rearward drive position with a neutral position in the middle. Preferably, a biasing means is also provided for resiliently biasing the drive roller to the forward drive position. A cam means is also provided on the base so that engagement with a cam surface positioned along the track pivots the drive roller to the neutral position to stop the pallet at a desired location. A cover extends over the track means and the pallet includes a platform which extends beyond one side of the track means and under the cover to which the object is attached.

Other features and advantages of the present invention are stated in or are apparent from a detailed description of a presently preferred embodiment of the invention found hereinbelow.

DETAILED DESCRIPTION OF THE PREFERRED EMBODIMENTS

Figure 1:
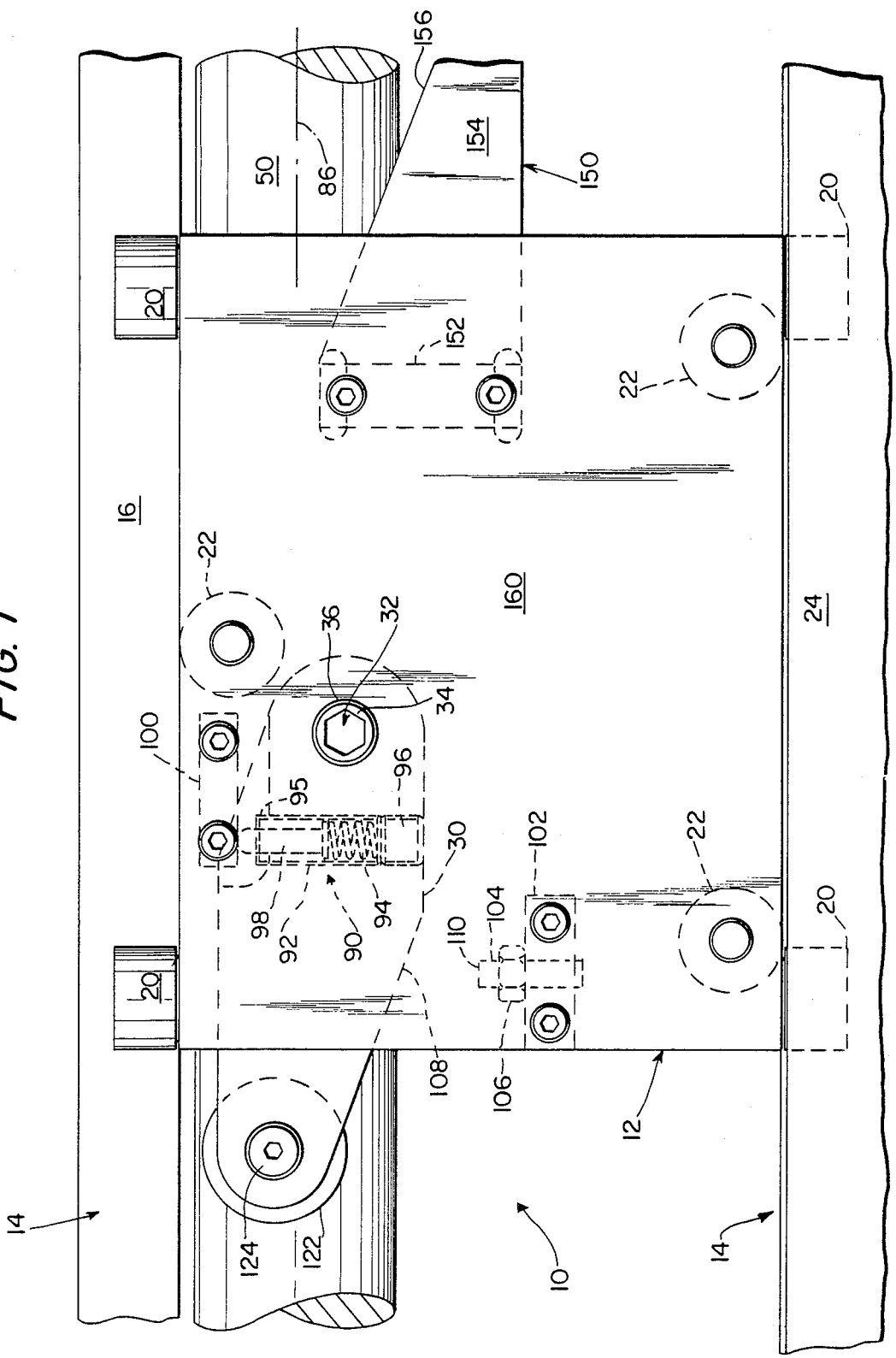
FIG. 1 is a top plan view of a conveying system according to the present invention.
Figure 2:
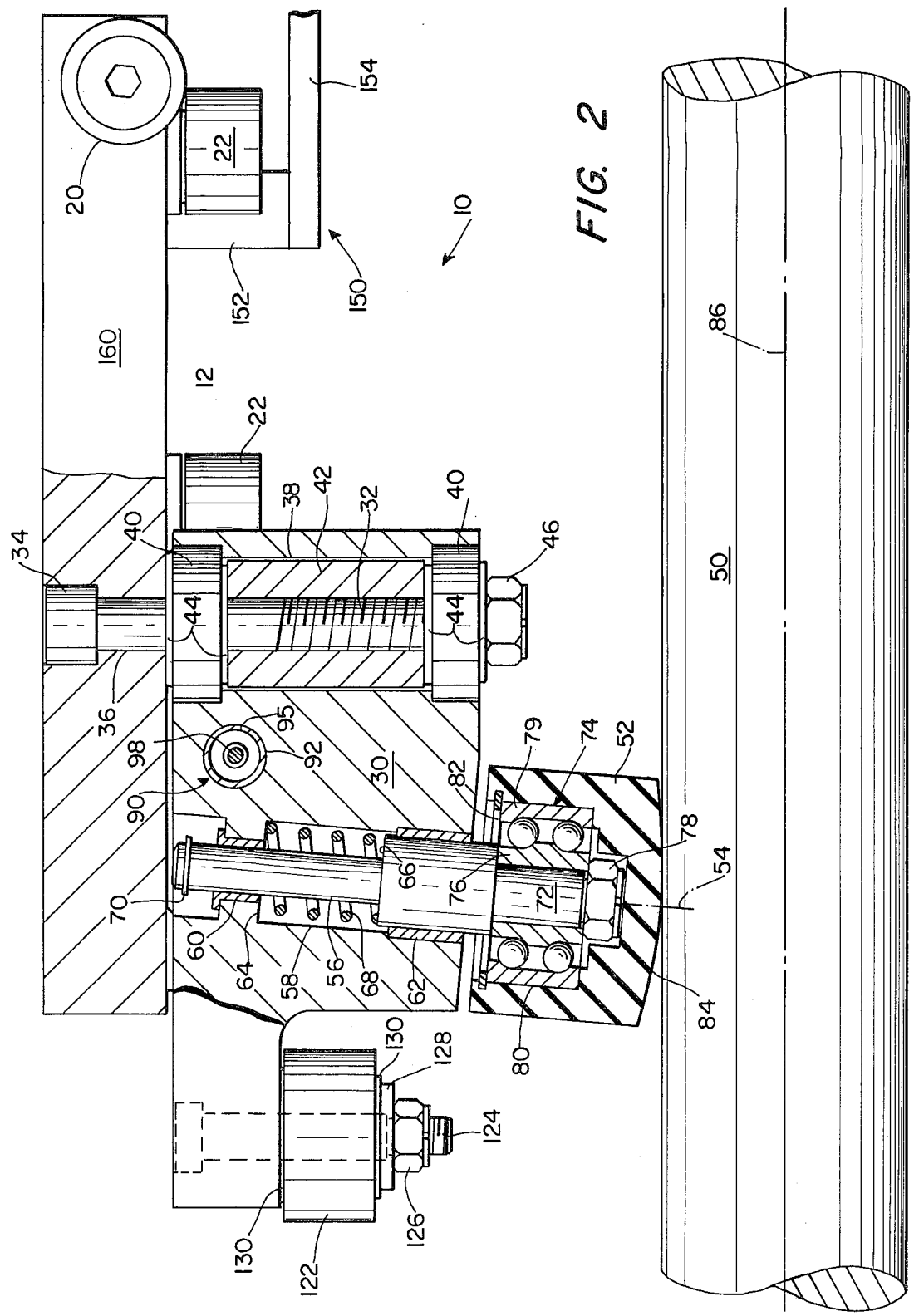
FIG. 2 is a front elevation view in partial cross section of the conveying system depicted in FIG. 1 with the tracks removed for clarity.
Figure 3:
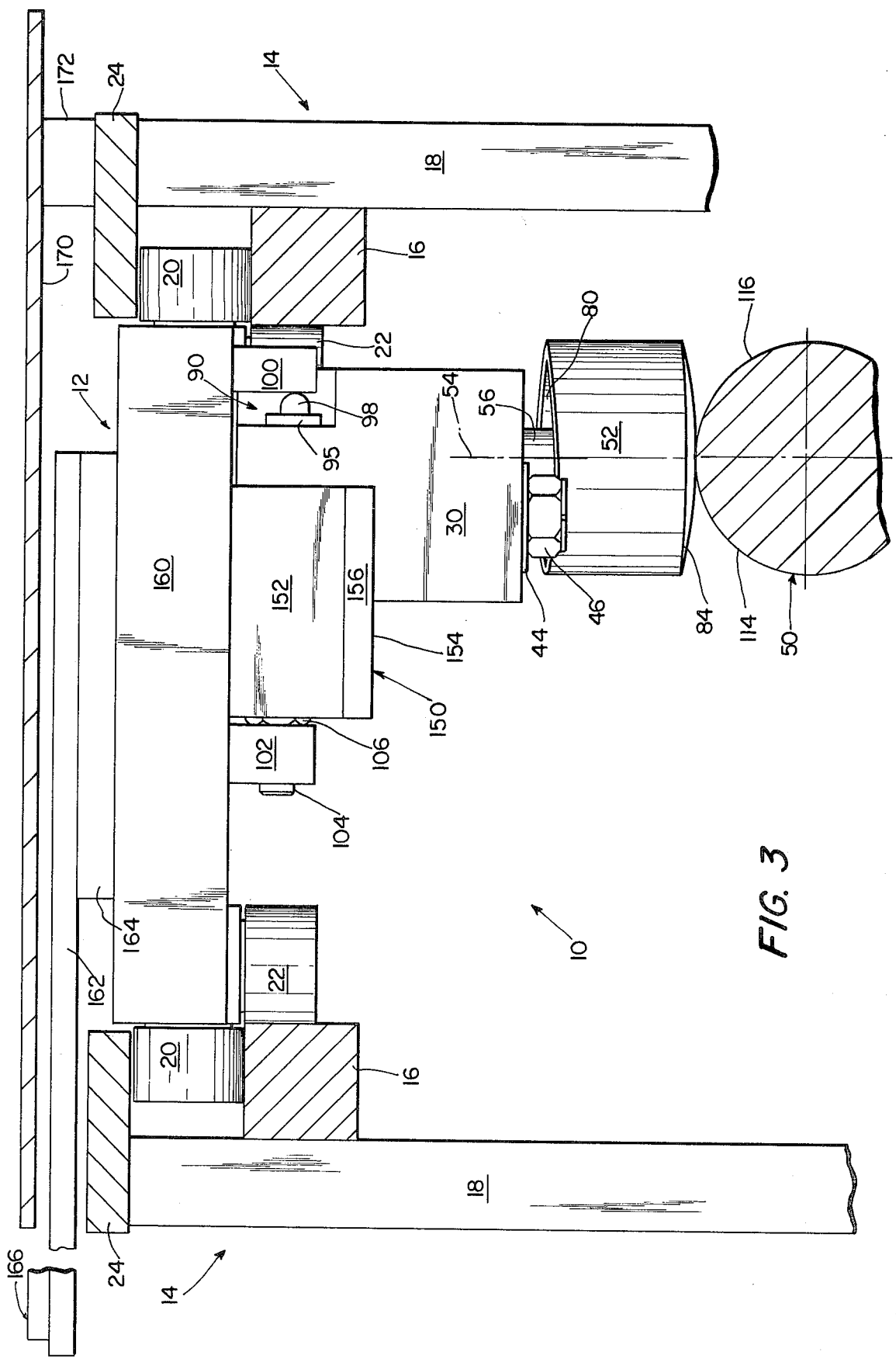
FIG. 3 is a side elevation view of the conveying system depicted in FIG. 1.

With reference now to the drawings in which like numerals represent like elements throughout the several views, a conveying system 10 according to the present invention is depicted in FIGS. 1, 2 and 3. Conveying system 10 includes a pallet 12 which is mounted for movement on a track means 14. Track means 14 includes a pair of elongate tracks 16 which are parallel to one another and which are supported by a plurality of supports 18 (two of which are shown). Pallet 12 is provided with vertical support wheels 20 which ride along the upper surfaces of tracks 16 and with lateral support wheels 22 which ride along the inner side surfaces of tracks 16. With this construction, pallet 12 is mounted for a relatively friction free longitudinal movement along tracks 16. It should also be noted that track means 14 is provided with retaining flanges 24 to maintain vertical support wheels 20 in position to engage tracks 16.

Located beneath pallet 12 is a base 30. As shown best in FIG. 2, base 30 is pivotally attached to pallet 12 for rotation in a horizontal plane by a shaft 32 which extends at a right angle with respect to the longitudinal plane of the pallet. Head portion 34 of shaft 32 is snugly received in a correspondingly shaped bore 36 in pallet 12. Located in a bore 38 in base 30 are bearing members 40 and a spacing member 42. Washers 44 are provided on either sides of bearing members 40 and a nut 46 is threadably received on the other end of shaft 32. With this construction, base 30 is firmly attached to pallet 12 while being freely pivotable in a horizontal plane relative to pallet 12.

Located below pallet 12 and directly underneath base 30 and extending parallel to tracks 16 is a cylindrical drive shaft 50. Drive shaft 50 is rotatable about the longitudinal axis thereof by a suitable means (not shown) at, for example, 150 rpm.

Located between base 30 and drive shaft 50 is a drive roller 52 which may be of polyurethane material. Drive roller 52 is rotatably mounted relative to base 30 about an axis 54 disposed at an acute angle with respect to the longitudinal axis of rotation of the drive shaft on an axle 56 disposed in a bore 58 in base 30. As shown best in FIG. 2, axle 56 is slidably mounted in bore 58 along axis 54 by bushings 60 and 62 attached to base 30. Bore 58 includes a shoulder 64 and axle 56 includes an enlarged portion 66. Disposed between shoulder 64 and enlarged portion 66 is a spring 68. Spring 68 urges axle 56 towards drive shaft 50 with less than 50 pounds of force. When pallet 12 is not located adjacent a drive shaft 50, a stop collar 70 prevents axle 56 from being urged out of base 30 by spring 68.

Drive roller 52 is rotatably mounted on distal end 72 of axle 56 by a bearing means 74. Bearing means 74 includes an inner race 76 which is secured on axle 56 by a nut 78. Outer race 79 of bearing means 74 is retained in a cavity 80 in drive roller 52 by a retaining snap ring 82. Drive roller 52 includes an axial face 84 which is opposite cavity 80 and which contacts drive shaft 50. Axial face 84 is depicted in FIG. 2 as having a convexly curved surface when viewed in cross section. A suitable curvature for axial face 84 is elliptical. However, axial face 84 could also be provided with a conical shape, or even a flat surface.

As shown best in FIG. 2, axis 54 about which drive roller 52 rotates is not perpendicular to the longitudinal axis of rotation 86 of drive shaft 50, so that the axial face 84 contacts drive shaft 50 at a point offset from the center of drive roller 52. The offset angle of axis 54 is between two to twenty degrees, and preferably is between five to fifteen degrees with respect to a vertical axis. By offsetting axis 54 somewhat, and with the small force exerted between drive roller 52 and drive shaft 50 (less than 5 pounds), no matter what the shape of axial face 84, axial face 84 contacts drive shaft 50 with what is to be considered as substantially tangential point contact.

Contained in base 30 is a resilient biasing means 90, FIG. 1, which resiliently pivots base 30 about shaft 32 to the forward drive position where drive roller 52 contacts inner quadrant 114, FIG. 3, of drive shaft 50. Biasing means 90 is disposed in a threaded bore 92 in base 30 and includes a spring 94 located in a threaded tube 95. Spring 94 presses against a threaded stop 96 in one end of bore 92 and against a movable rod 98 located in tube 95 which thus urges rod 98 away from stop 96. Mounted on the underside of pallet 12 adjacent the outer end of rod 98 is a stop block 100. As base 30 is pivotable relative to pallet 12, the end of rod 98 presses against stop block 100 so that spring 94 causes base 30 to pivot away from stop block 100 to the drive position. The force with which rod 98 urges base 30 to the drive position is adjustable by moving stop 96. It should be noted that base 30 is depicted in FIGS. 1 to 4 in the neutral position.

In order to prevent base 30 from pivoting beyond the drive position, a drive stop block 102 is mounted to the underside of pallet 12 on the opposite side of base 30 from stop block 100. Threadably mounted in drive stop block 102 is a set screw 104 with a locking nut 106. As base 30 pivots inwardly to the drive position due to the force of spring 94, edge 108 of base 30 contacts end 110 of set screw 104 so that further pivoting of base 30 is prevented. The precise location of end 110 of set screw 104 is adjusted with locking nut 106 so that base 30 pivots to a specific position where drive roller 52 contacts drive shaft 50 at the inner edge thereof and the specific location of the point of contact determines the speed with which pallet 12 is driven as will be explained subsequently. Therefore, end 110 of set screw 104 can be positioned to achieve a maximum forward drive speed for pallet 12, or for a desired lesser forward drive speed.

In operation, pallet 12 is driven along track means 14 in the following manner. With reference to FIG. 3, drive roller 52 and base 30 are shown in the neutral position where pallet 12 is not driven along track means 14. In this neutral position, drive roller 52 is centered over drive shaft 50 so that axial face 84 of drive roller 52 contacts drive shaft 50 at the topmost point. It should be noted that although the axis 54 of rotation of drive roller 52 is offset slightly along the longitudinal length of drive shaft 50, drive roller 52 does not drive pallet 12 in either direction as drive roller 52 spins freely about axis 54.

As depicted in FIGS. 1, 2 and 3, base 30 is free to pivot about shaft 32 due to the urging of resilient biasing means 90. Thus, with drive shaft 50 constantly rotating, base 30 and drive roller 52 are urged over the inner quadrant 114 (see FIG. 3) of drive shaft 50. This causes the point of contact between axial face 84 and drive shaft 50 to shift radially from the center of axial face 84. When this occurs, drive roller 52 continues to freely rotate about axis 54, but a longitudinal driving force is now also exerted by drive shaft 50 on drive roller 52. This drive force then causes pallet 12 to move along track means 14. It should be noted that the direction of travel of pallet 12 depends upon the direction of rotation of drive shaft 50. Rotation of drive shaft 50 in one direction causes pallet 12 to move in one direction along track means 14 whereas the opposite rotation of drive shaft 50 causes pallet 12 to move in an opposite direction along track means 14.

As drive roller 52 is urged into contact with inner quadrant 114 of drive shaft 50 by biasing means 90, it should be noted that the rotation of drive shaft 50 also urges drive roller 52 and base 30 in the same direction. Therefore, base 30 and drive roller 52 continue to move away from the top of drive shaft 50 until edge 108 of base 30 contacts end 110 of set screw 104. End 110 of set screw 104 is conveniently locked in place by locking nut 106 at a location whereby pallet 12 is moved along track means 14 at a desired velocity, or at the maximum velocity. It should be noted that axial face 84 of drive roller 52 is resiliently urged in contact with drive shaft 50 so that axial face 84 remains in contact with drive shaft 50 even though inner quadrant 114 of drive shaft 50 is spaced somewhat further away from base 30 than the top of drive shaft 50.

With base 30 in the forward drive position where axial face 84 is in contact with inner quadrant 114 of drive shaft 50, pallet 12 moves freely along track means 14 on wheels 20 and 22. In addition, pallet 12 is precisely and positively maintained on track means 14.

In many industrial applications, it is desirous to have pallet 12 of conveying system 10 capable of being stopped at one or more work stations situated along the length of track means 14 where a variety of operations can be performed on the object carried by pallet 12. Conveying system 10 of the present invention includes a positioning means 120 depicted in FIG. 4 to perform this function.

Figure 4:
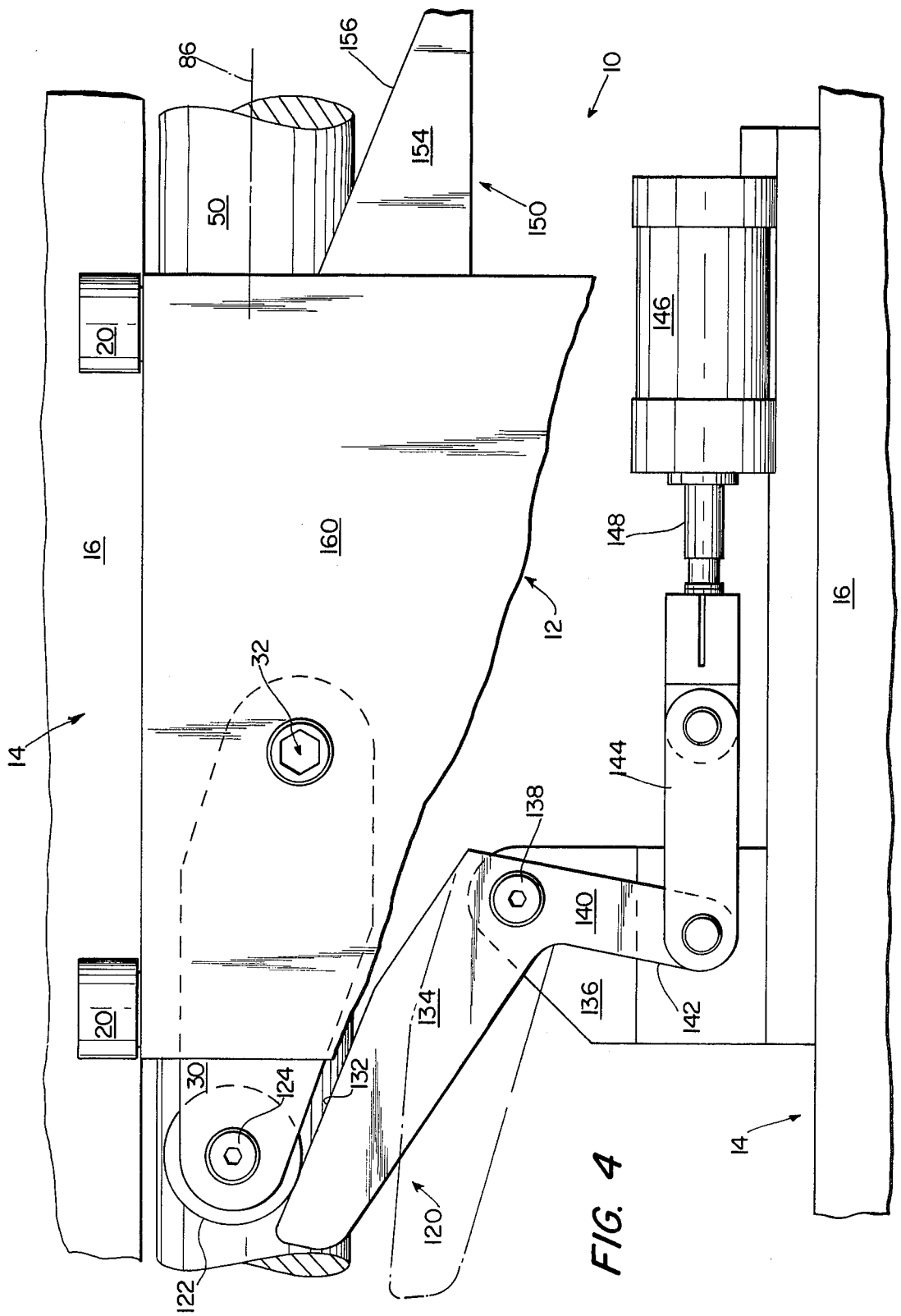
FIG. 4 is a partially broken away top view of the conveying system depicted in FIG. 1 showing a cam stopping mechanism of the present invention.

With reference therefore to FIG. 4 in addition to FIGS. 1, 2 and 3, a positioning means 120 is depicted for stopping and maintaining pallet 12 at a desired location. Positioning means 120 includes a cam roller 122 which is rotatably mounted to base 30 by an axle 124. Cam roller 122 is held on the lower end of axle 124 by a nut 126 and a retaining washer 128. Cam roller 122 includes a central bearing member (not shown) and washers 130 on either side so that cam roller 122 is substantially freely rotatable about axle 124.

Pallet 12 in FIG. 4 is designed for forward movement from right to left. Cam roller 122 extends below base 30 and is positioned to contact a cam surface 132. Cam surface 132 is disposed at an angle to the vertical axis of drive shaft 50 and is part of an arm 134. Arm 134 is pivotally mounted to a support 136 by a shaft 138. Support 136 is securely attached to track means 14. Integrally formed to arm 134 at an angle thereto is a lever arm 140. The distal end 142 of lever arm 140 is attached by a coupling member 144 to a fluid actuator 146. Fluid actuator 146 is a double acting pneumatic or hydraulic actuator having a reciprocating rod arm 148. Fluid actuator 146 moves cam surface 132 of arm 134 from the position depicted in FIG. 4 where cam roller 122 contact scam surface 132 to a position where cam roller 122 does not contact cam surface 132 (shown in phantom).

In operation, positioning means 120 functions in the following manner. As pallet 12 moves from right to left with base 30 in the drive position and drive roller 52 contacting rotating drive shaft 50, arm 134 is maintained by fluid actuator 146 in the position shown in FIG. 4. Arm 134 is positioned along track means 14 at a location where it is desired to stop pallet 12. As pallet 12 moves along track means 14, cam roller 122 engages cam surface 132. At the initial point of engagement, base 30 is in the forward drive position with drive roller 52 located so that axial face 84 is contacting inner quadrant 114 of drive shaft 50. As cam roller 122 continues to move along cam surface 132 which is located at an angle with respect to drive shaft 50, cam surface 132 causes base 30 to rotate about shaft 32. This causes axial face 84 of drive roller 52 to correspondingly move along inner quadrant 114 of drive shaft 50 towards the uppermost point of drive shaft 50. Pallet 12 continues forward movement so long as axial face 84 is in contact with inner quadrant 114, although the velocity of forward movement continually decreases as the point of contact between axial face 84 and drive shaft 50 approaches the uppermost point on drive shaft 50. Thus, as pallet 12 moves forward and cam roller 122 continues along cam surface 132, the velocity of pallet 12 quickly decreases and finally stops as the point of contact of axial face 84 with drive shaft 50 reaches the uppermost, neutral or no drive position, on drive shaft 50.

Frequently, due to the momentum of pallet 12, the point of contact between axial face 84 and drive shaft 50 will be shifted up to the uppermost point and then slightly beyond to outer quadrant 116 of drive shaft 50. Once the point of contact of axial face 84 has shifted to outer quadrant 116, drive roller 52 is in a rearward drive position and will back-up. However, as resilient biasing means 90 continuously biases base 30 to the forward drive position, as pallet 12 backs up base 30 immediately pivots inwardly causing the point of contact between axial face 84 and drive shaft 50 to shift towards the uppermost point on drive shaft 50 which is a neutral position. Again it is possible for the backward movement of pallet 12 to cause the point of contact of axial face 84 and drive shaft 50 to travel beyond the uppermost point to the forward drive position in which case cam roller 122 again acts against cam surface 132 to move the point of contact to the neutral position. Therefore, it is readily apparent that base 30 is quickly located at the neutral position where the point of contact between axial face 84 and drive shaft 50 is at the uppermost point of drive shaft 50. At this time, a separate precise positioning means (not shown) can lock pallet 12 in a precise position so that an operation can be performed on the object carried by pallet 12.

Once the operation has been performed on the object carried by pallet 12, fluid actuator 146 is operated to withdraw rod arm 148 and to thus pivot arm 134 so that cam roller 122 is no longer in contact with cam surface 132. As soon as arm 134 is moved, resilient biasing means 90 again causes base 30 to pivot to the forward drive position and pallet 12 quickly accelerates away from positioning means 120. After pallet 12 has gone by, fluid actuator 146 is again operated to move arm 134 back to the position so that cam roller 122 of the succeeding pallet 12 traveling along track means 14 is stopped at positioning means 120 if so desired.

Where a plurality of pallets 12 are conveyed along track means 14, a stop tail 150 is attached to the rear portion of pallet 12 as shown in the figures. Stop tail 150 includes an attaching flange 152 by which stop tail 150 is attached to pallet 12 by screws or the like and a tail portion 154. Tail portion 154 extends horizontally behind pallet 12 and has a cam surface 156. Cam surface 156 is vertically and laterally located to make contact with cam roller 122 of the succeeding pallet 12.

In operation, stop tail 150 functions in the following manner. If it is desired to stack a number of pallets 12 along track means 14 while other pallets 12 are advancing and/or stopping at work stations, or if one pallet 12 is inadvertently prevented from advancing along track means 14, stop tails 150 of each pallet 12 in cooperation with cam rollers 122 of each succeeding pallet 12 prevents the pallets 12 from colliding with one another and from damaging conveying system 10. Where one pallet 12 is stationary with respect to track means 14 for whatever reason, and another pallet 12 is driven by drive shaft 50 towards the first pallet, the first contact between the two pallets is cam roller 122 of the second pallet engaging cam surface 156 of stop tail 150 of the first pallet 12. The function of cam surface 156 of stop tail 150 is essentially the same as cam surface 132 of positioning means 120. That is, as second pallet 12 continues to be driven by drive shaft 50 and drive roller 52 toward first pallet 12 after cam roller 122 of the second pallet contacts cam surface 156 of the first pallet, cam roller 122 follows the angle of cam surface 156 and causes base 30 of the second pallet 12 to pivot from the forward drive position to the neutral position (or slightly to the rear drive position). Thus, second pallet 12 is quickly deaccelerated by the action of cam roller 122 of second pallet 12 on cam surface 156 of first pallet 12 and a collision is avoided. As with positioning means 120, base 30 of second pallet 12 quickly finds the neutral position and is maintained there. In a similar manner, a succeeding pallet 12 is similarly stopped and maintained by the adjacent forward pallet 12. As soon as the first pallet 12 is released and moves forward, cam roller 122 of the succeeding pallet is released and base 30 moves to the forward drive position and that pallet 12 advances. In the same manner, each succeeding pallet 12 successively advances as well.

In the preferred embodiment of the invention as depicted in FIG. 3, where conveying system 10 is used to convey an object between a plurality of work stations, pallet 12 includes a platform 160 to which a stage 162 is attached by a spacer 164. Stage 162 extends slightly above and laterally beyond one track means 14 as shown. Near the distal end of stage 162 is a suitable object mounting means 166. With this construction, the object is located on one side of conveying system 10 and is easily accessible at any work station from any desired direction (top, sides, and bottom) without interference from conveying system 10. This also allows each work station to be easily constructed at an appropriate location on one side of conveying system 10. It should be appreciated that where the object located on mounting means 166 is sufficiently heavy, vertical support wheel 20 adjacent to the object contacts track 16 while vertical support wheel 20 and lateral support wheel 22 located away from the object are urged upwards into contact with retaining flange 24 and laterally into contact with track 16, respectively.

It should be noted that a cover 170 is used to protect the entire length of conveying system 10. As shown in FIG. 3, cover 170 is mounted to retaining flange 24 on the opposite side from mounting means 166 by a series of spacers 172 (one of which is shown). Stage 162 projects underneath and beyond cover 170. With cover 170, any oil or debris created by the work stations or otherwise is kept away from conveying system 10. In particular, oil is kept off of drive shaft 50 which could interfere with the propulsion of pallet 12 by drive roller 52.

While the present invention has been described with a drive roller 52 which pivots about a vertical axis (the axis of shaft 32) between a forward drive position and a rearward drive position relative to drive shaft 50, it should be appreciated that the orientation of the pivoting axis is merely one of convenience. The only requirement of the pivoting axis is that drive roller 52 must be movable relative to drive shaft 50 from a forward drive position to a rearward drive position.

Thus, while the present invention has been described with respect to exemplary embodiments thereof, it will be understood by those of ordinary skill in the art that these and other variations and modifications can be effected within the scope and spirit of the invention.

We claim:

1. A conveying system for moving an object along a straight path comprising:
   a pallet on which the object is conveyed;
   track means for mounting said pallet for straightline movement;
   a cylindrical drive shaft disposed adjacent and parallel to said track means and having a longitudinal axis about which said drive shaft rotates;
   a drive roller rotatable about an axis and having an axial face;
   mounting means for mounting said drive roller to said pallet for rotation such that the axis of rotation of said drive roller is disposed at an acute angle with respect to the longitudinal axis of said drive shaft and such that said axial face of said drive roller tangentially contacts said drive shaft whereby said pallet is driven along said track means.

2. A conveying system as claimed in claim 1 wherein said mounting means includes a resilient means for resiliently urging said drive roller in contact with said drive shaft.

3. A conveying system as claimed in claim 2 wherein said resilient means urges said drive roller into contact with said drive shaft with less than 50 pounds of force.

4. A conveying system as claimed in claim 2 wherein said mounting means further includes a base to which said resilient means is attached and a pivot means for pivotally attaching said base to said pallet such that said base is pivotable about an axis parallel to a plane perpendicular to the longitudinal axis of said driving shaft such that said drive roller stays in contact with said drive shaft and is movable between a forward drive position on one side of said driving shaft, and a rearward drive position on the other side of said driving shaft.

5. A conveying system as claimed in claim 4 wherein said mounting means further includes a bias means for resiliently biasing said base to the forward drive position.

6. A conveying system as claimed in claim 5 wherein said mounting means further includes a cam means mounted to said base for engaging a cam surface positioned adjacent said track means and for pivoting said base to the neutral position.

7. A conveying system as claimed in claims 2 or 6 wherein said axial face of said drive roller has a slight convex shape.

8. A conveying system as claimed in claim 7 wherein said axial face is elliptically shaped.

9. A conveying system as claimed in claims 2 or 6 wherein said axial face of said drive shaft has a slight conical shape.

10. A conveying system as claimed in claims 2 or 6 wherein said axial face of said drive shaft is substantially flat.

11. A conveying system as claimed in claims 2 or 6 wherein the axis of rotation of said drive roller is disposed at an angle of between two to twenty degrees with respect to a vertical plane perpendicular to the longitudinal axis of the drive shaft.

12. A conveying system as claimed in claim 11 wherein the axis is disposed at an acute angle of between five to fifteen degrees.

13. A conveying system as claimed in claims 2 or 6 wherein said drive roller is made of a polyurethane material.

14. A conveying system as claimed in claims 4 or 6 wherein said mounting means further includes a bore in said base coaxial with the axis of rotation of said drive roller, an elongate axle slidably mounted in said bore and having a distal end, a spring means located in said bore for urging the distal end of said axle towards said drive shaft, a cavity in said drive roller opposite said axial face, and a bearing means retained in said cavity and attached to the distal end of said axle.

15. A conveying system as claimed in claim 6 further including a stop tail mounted on said pallet and having a cam surface positioned to contact said cam means of a succeeding pallet such that before one pallet collides with the other pallet said cam surface of said stop tail of the preceding pallet causes said cam means of said succeeding pallet to pivot said base of said succeeding pallet to the neutral position to stop said succeeding pallet before a collision occurs.

16. A conveying system as claimed in claims 2 or 6 and wherein said track means includes a pair of parallel tracks and said pallet includes a portion which extends laterally beyond said track means and on which the object is mounted.

17. A conveying system as claimed in claim 16 wherein said drive shaft is located between said pair of tracks and further including a cover extending along the length of said track means so as to cover said tracks and the area therebetween.

18. A conveying system as claimed in claim 5 wherein said mounting means further includes a stop means for limiting the pivoting of said base to a preset forward drive position under the influence of said bias means.

* * * * *